United States Patent
Hood et al.

[11] 3,791,430
[45] Feb. 12, 1974

[54] METHOD AND APPARATUS FOR SIMULTANEOUSLY STRIPPING AND FINISHING LOGS

[76] Inventors: James A. Hood, P.O. Box 7-70744, Holden, La. 70744; Roy H. Barksdale, 219 E. Roberts St., Hammond, La. 70401

[22] Filed: Dec. 6, 1972

[21] Appl. No.: 312,753

Related U.S. Application Data
[62] Division of Ser. No. 142,186, May 11, 1971.

[52] U.S. Cl............. 144/326, 144/3 R, 144/133 R, 144/136 G, 144/208 G
[51] Int. Cl.......... B27m 3/00, B27l 1/00, B27f 1/02
[58] Field of Search.... 144/208 G, 208 R, 3 R, 309, 144/323, 326, 136 R, 136 G, 136 H, 133 R

[56] References Cited
UNITED STATES PATENTS
442,471   12/1890   Ames............................. 144/208 G
1,881,465   10/1932   Ganes et al..................... 144/208 G
2,602,476   7/1952   Tibbets........................... 144/136 H
2,705,031   3/1955   Fowler............................ 144/133 R

*Primary Examiner*—Donald R. Schran
*Attorney, Agent, or Firm*—Stevens, Davis, Miller & Mosher

[57] ABSTRACT

An apparatus and method for stripping and finishing logs, including an arcuately shaped cutting member for simultaneously stripping and finishing the logs, a second cutter member for cutting a longitudinal groove in the thus finished log and a third cutter member for cutting a transverse groove in the thus finished log, both said grooves having an arcuate shape, the radius of which is approximately equal to the radius of the thus finished log.

3 Claims, 9 Drawing Figures

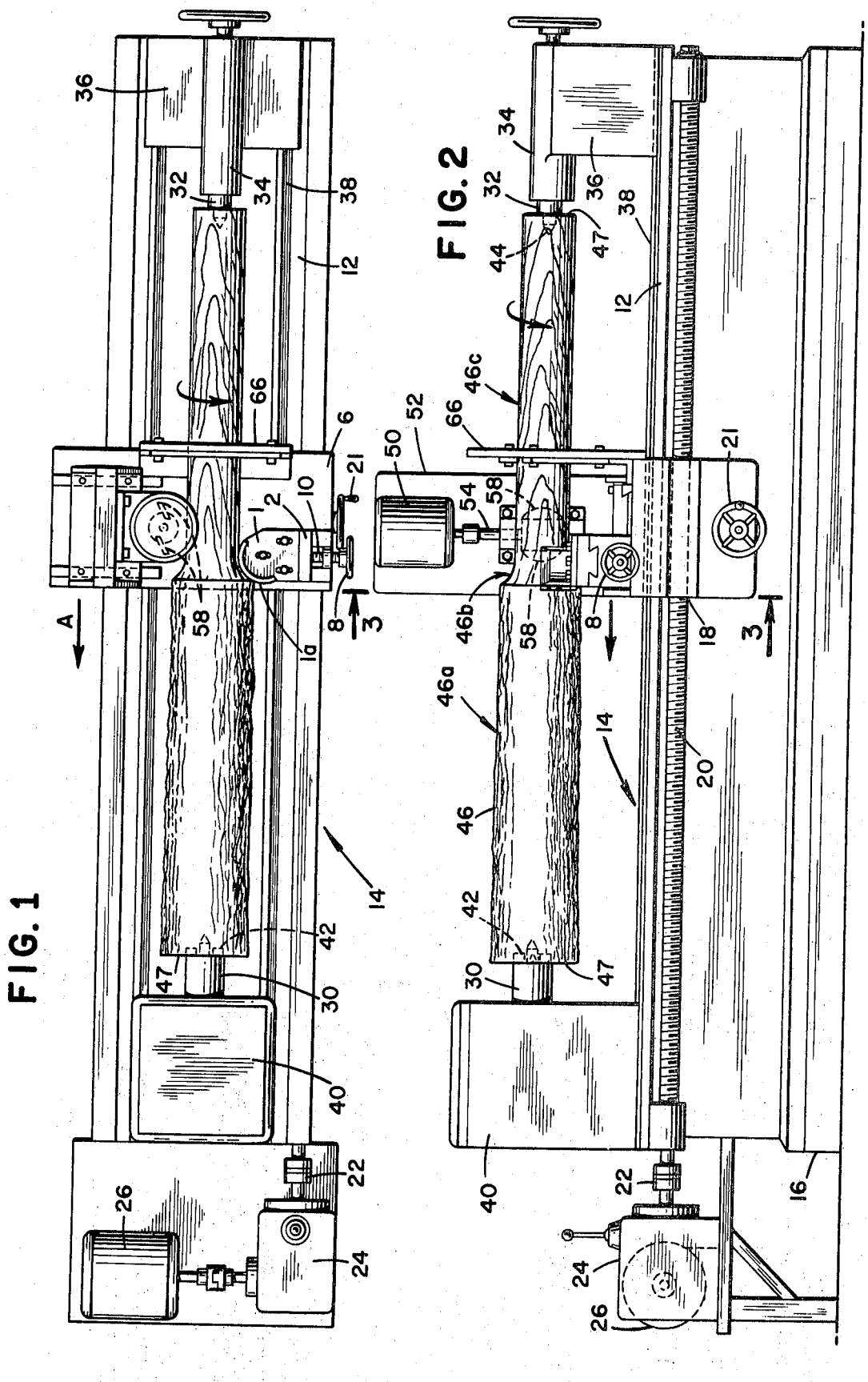

METHOD AND APPARATUS FOR SIMULTANEOUSLY STRIPPING AND FINISHING LOGS

This a division, of application Ser. No. 142,186, filed May 11, 1971.

The present invention is directed to a novel method and apparatus for finishing logs and particularly to a method and apparatus for stripping and finsihing logs for use in the building of log cabins and similar structures.

In preparing logs for use in such structures, it is necessary to first peel the outer covering, including the bark and underlying surface portions from the log. Next, the log is stripped to a predetermined depth so that the finished log will have a desired diameter. Finally, the surface of the log is then finished to give the log a smooth texture relatively free from bumps and other protrusions.

Additionally, and preferably, a longitudinal groove is cut in the finished log so that it will stack snugly on top of another similarly finished log. Lastly, a transverse groove is cut near the end or ends of each log to provide the interlocking corner relationship which is a characteristic of log built structures.

Heretofore, each step required to provide a finished and grooved log had to be undertaken separately. Thus, the operation has been a time consuming and relatively expensive one. One of the principal features of the present invention resides in the use of an arcuately shaped cutting member which simultaneously strips a log of its outer covering, including the bark and underlying surface portions, with the leading edge of the cutting surface, cuts the stripped log to the desired depth of thickness with the main section of the cutting edge to achieve the desired end-product diameter, and finally finishes the exposed surface of the log with the trailing, almost tangential, edge of the arcuate cutting blade.

The advantages achieved over prior methods which use a straight cutting tool are readily apparent. In such prior methods, the cutting tool was first set to strip the outer cover of the log and then had to be reset one or more times to cut away enough of the outer portions of the log to achieve the desired end diameter. Finally, the cutting tool had to be precisely positioned to finish the surface of the log without making additional cuts.

A problem which arises in log finishing operations of this type is that the logs naturally taper from one end to the other. Therefore, in devices which use the old style straight cutter, if the cutter is started at the wider end of the log, it will be necessary to continuously adjust the blade position to maintain the proper cutting depth, at least until the taper has been removed.

The arcuately shaped cutting surface of the present invention overcomes this problem by enabling the cutting member to be set initially to the desired depth of cut. In essence, the arcuate cutting blade is continuously self-adjusting. From the point of initial contact of the arcuate cutting surface with the log to the point of tangency, the cutting depth is gradually increased as the cutting tool moves along the log. Thus, no unnecessary strain is imparted to the cutting surface thereby making it less likely to break, as would be possible with a straight cutting blade set to an improper cutting depth.

Therefore, it is an object of the present invention to provide an improved method for simultaneously stripping and finishing logs, and then grooving them longitudinally and transversely.

A second object is to provide an apparatus for carrying out the aformentioned method, particularly with respect to providing an apparatus for simultaneously stripping and finishing the log.

A further object is to provide apparatus in addition to and in combination with the stripping and finishing structure for grooving the finished log both longitudinally and transversely.

The best mode presently contemplated by the inventors for carrying out this invention will be described hereinafter with reference to the attached drawing which shows a preferred, although not the exclusive, embodiment of this invention, wherein:

FIG. 1 shows a top view of the preferred embodiment;

FIG. 2 shows a side view thereof;

Figure 3:
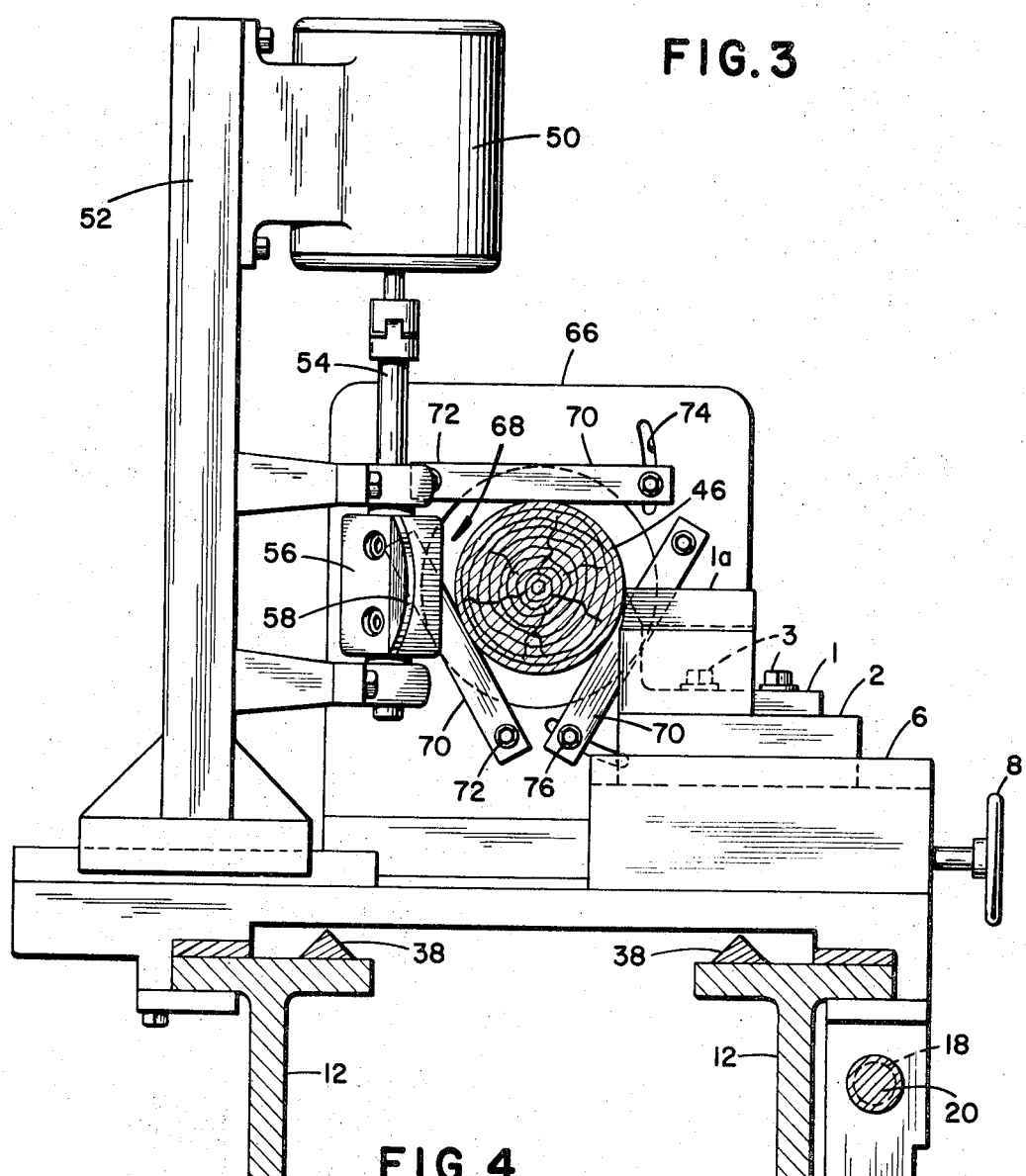
FIG. 3 shows a section taken along the line 3—3 of FIG. 2.
Figure 4:
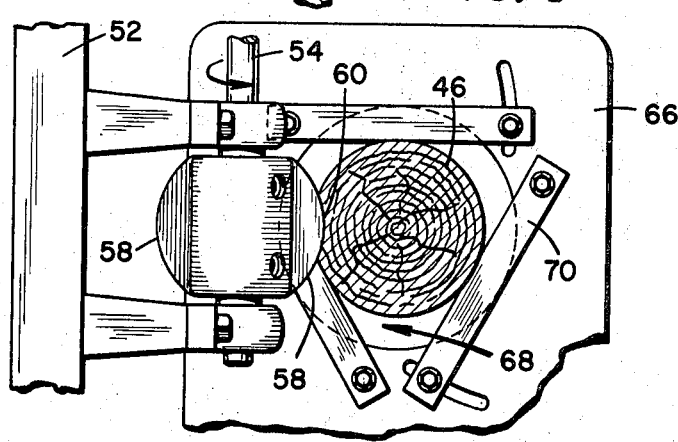
FIG. 4 shows a further detail of the longitudinal groove cutter and restraining means described hereinafter.

In the apparatus shown in the drawing, a cutting member 1 having an arcuately shaped cutting edge 1a is adjustably mounted on a support plate 2 by means of a plurality of bolt-washer combinations 3 which pass through slots 4 in member 1 and are secured by appropriate means to support plate 2. This assembly is then mounted for transverse adjustment on a carriage 6. Transverse adjustment of the cutting member 1 can be carried out by a wheel 8, or other appropriate handle means, connected to a threaded rod 10 which in turn may be mated with a threaded receptacle (not shown) mounted on the underside of support member 2.

Carriage 6 is mounted in turn on guide rail portions 12 of a frame generally designated by 14, guide rails 12 being mounted on a bed 16 of frame 14. Carriage 6 has a threaded receptacle 18 which receives a threaded rod 20. Rod 20 is connected through a coupling 22 and transmission 24 to a drive motor 26. In operation, motor 26 is engaged by transmission 24 and coupling 22 to rotate rod 20 about its longitudinal axis; this rotation serves to move carriage 6 in the direction of arrow A (or in the opposite direction depending upon the operating state of transmission 24).

In addition to being longitudinally movable through driven rod 20, carriage 6 may be manually adjusted longitudinally by means of a wheel 21 (or other functionally similar handle) through a conventional mechanism, such as a worm gear drive means (not shown).

Also mounted on frame 14 are shafts 30 and 32. Shaft 32 is rotatably mounted in housing 34 which in turn is mounted on support member 36. Member 36 rests on rails 12 of frame 14 and is guided by members 38 for longitudinal movement toward or away from shaft 30.

Shaft 30 is mounted to be rotatably driven by a motor shown generally by reference numeral 40, motor 40 in turn is conventionally mounted on frame 14. The motor 40 - shaft 30 drive connection can be any one or combination of gear means, clutch means, belt means, or any other mechanism well known to those skilled in the art of lathe drive mechanisms.

Shafts 30 and 32 have chucks 42 and 44 mounted on their respective ends. Each chuck has a plurality of projections which penetrate the end portions 47 of a log 46 to be worked on. As shown in the drawing, log 46 has three sections; an unfinished section 46a which has not yet been worked on; transition section 46b, currently being worked on; and finished section 46c. By using a chuck which penetrates the end portion rather than grips the circumference of the log, a pre-cut log can be stripped and finished from end to end in a single operation.

Figure 5:
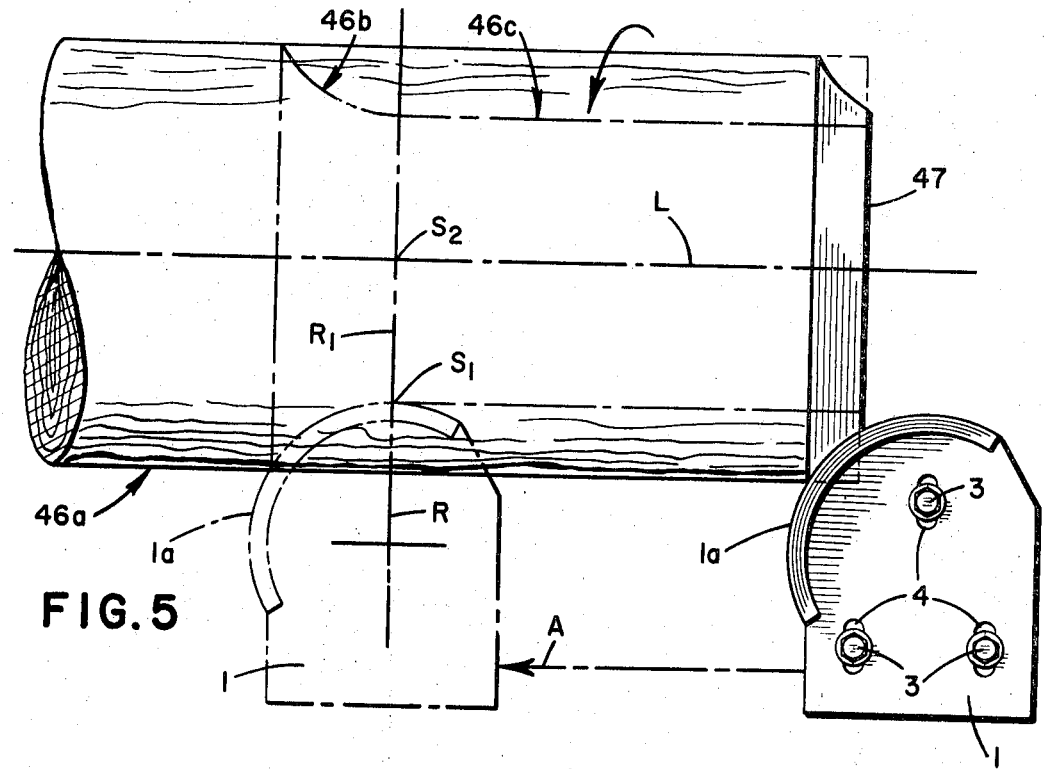
FIG. 5 is a detail showing the relationship between the arcuate cutting member and the log being finished.
Figure 6:
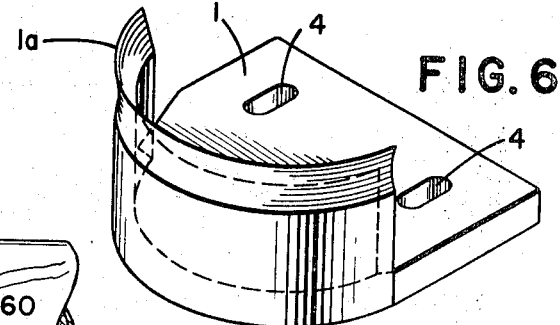
FIG. 6 is a perspective of the arcuately shaped cutting member.

As noted, log 46 is rotatably mounted on the shafts 30 and 32 by means of penetrating chucks 42 and 44, respectively; the carriage 6 can be initially positioned at one end of the frame 14 with cutting member 1 disposed completely out of contact with log 46. After log 46 has begun to rotate, by means of the motor 40 connected to shaft 30, motor 26 is then engaged by transmission 24 to drive threaded rod 20 which in turn drives carriage 6 and cutting member 1 in the direction of arrow A. As shown in FIG. 5, the arcuately shaped cutting surface 1a first contacts the outer covering of log 46 at the end portion thereof. As carriage 6 continues to move in the direction of arrow A, more and more of the arcuate cutting surface 1a engages log 46 to cut away the outer portion of the log to the desired depth. This depth is determined by the transverse adjustment of cutting member 1 on carriage 6 and is measured by the distance along a line $R_1$ coincident with a radius R of the arcuate cutting surface which is perpendicular to the longitudinal axis of the log from its point of intersection $S_1$ with the arc to its point of intersection $S_2$ with the longitudinal axis of the log.

The arc of cutting surface 1a is continued rearwardly of radius R. Thus the cutting away of the outer portion of the log is done relatively gradually, tapering off as the arc nears perpendicular radius R so that at the point $S_1$ on the arcuate surface 1a intersected by the perpendicular radius R, the surface of the log is tangential to the cutting surface. The result of this is a gradually diminishing cutting surface which by its very nature becomes a finishing surface.

From the above description, it becomes readily apparent that in a single operation with the arcuate cutting surface 1a, the log 46 is stripped of its outer covering, turned down to the desired end diameter, and finished to remove surface roughness.

Also mounted on carriage 6, perpendicularly to the longitudinal axis of log 46 is a plate 66 having an opening 68 through which log 46 may pass. Mounted on plate 66 are three bars 70. Each bar 70 is rotatable about one end 72 pivotally connected to plate 66 and movable through an arc defined by slot 74 cut in plate 66. Radial adjustment of bar 70 is carried out by means of a bolt-washer combination 76 which can be loosened to permit adjustment of bar 70 and then tightened to retain the bar in the desired position. The three bars 70 form a roughly triangularly shaped opening through which the finished portion of log 46 passes. Optimally, bars 70 touch the finished portion of log 46 tangentially at points spaced equally from each other along the circumference of the finished log. The purpose of the bars 70 is to prevent whipping of the log due to the action of cutting tool 1.

In addition to the above, motor 50 is mounted on carriage 6 through a support member 52. Motor 50 is connected through a drive shaft 54 to a second cutting member 56 having two arcuately shaped cutting blades 58. The radius of the arc defined by blades 58 is preferably substantially equal to the radius of the finished log.

During the above described stripping and finishing stage, while log 46 is rotating about its longitudinal axis, motor 50 is turned off and blades 58 held out of contact with log 46, thereby maintaining cutting member 56 in an inoperative state. When carriage 6 has completed a full traverse of log 46, i.e., when the stripping and finishing operation has been completed, motor 40 is deactivated and log 46 is held in a non-rotatable state. Motor 50 is then activated, causing blade 58 of cutting member 56 to begin rotating. Transmission 24 is then placed in reverse to reverse the direction of rotation of threaded rod 20, thereby causing carriage 6 to begin traveling in the opposite direction to that of arrow A.

As carriage 6 traverses log 46 in this opposite direction, blades 58 cut a longitudinal groove 60 in log 46. If, as noted above, the radius of the arcuately shaped groove 60 is substantially equal to the radius of the finished log, the arcuate surface of the groove will have a shape substantially similar to the circumference of the log. This will facilitate stacking the logs when using them for building cabins and the like. The depth of longitudinal groove 60 is determined by adjustment of support 52 in a direction transverse to the direction of travel of carriage 6.

The operations of stopping motor 40, starting motor 50 and reversing the direction of travel of carriage 6 may be accomplished either manually or automatically through a switching mechanism actuated by carriage 6 when it reaches a predetermined point in its travel, preferably after a full traverse of the log.

Figure 7:
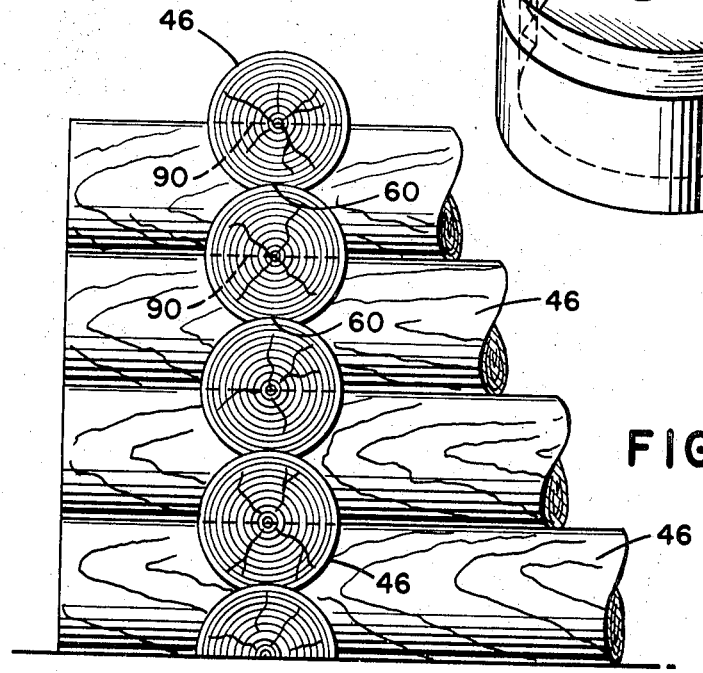
FIG. 7 shows the manner in which the finished logs are stacked.
Figure 8:
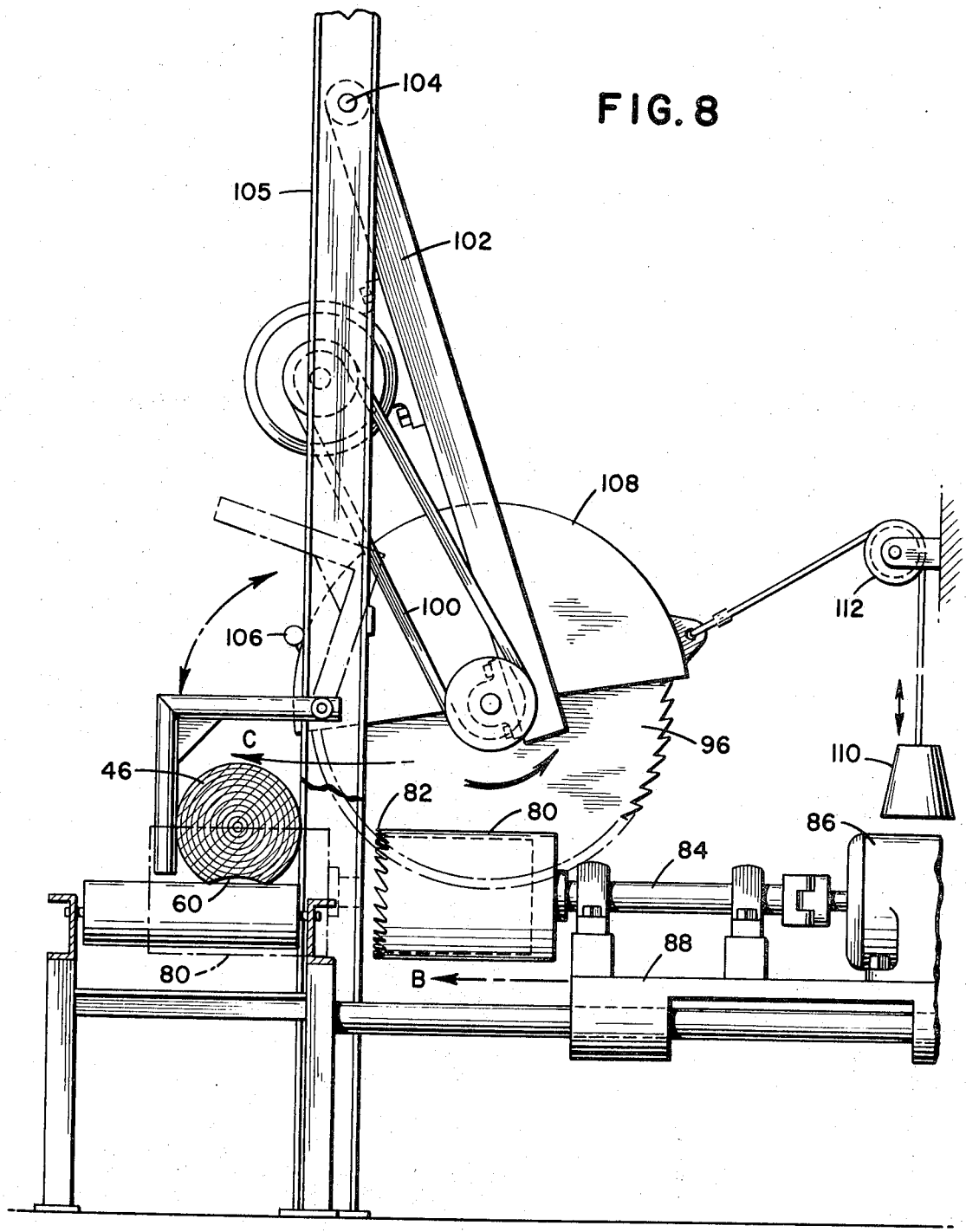
FIG. 8 is a side view of the transverse groover.
Figure 9:
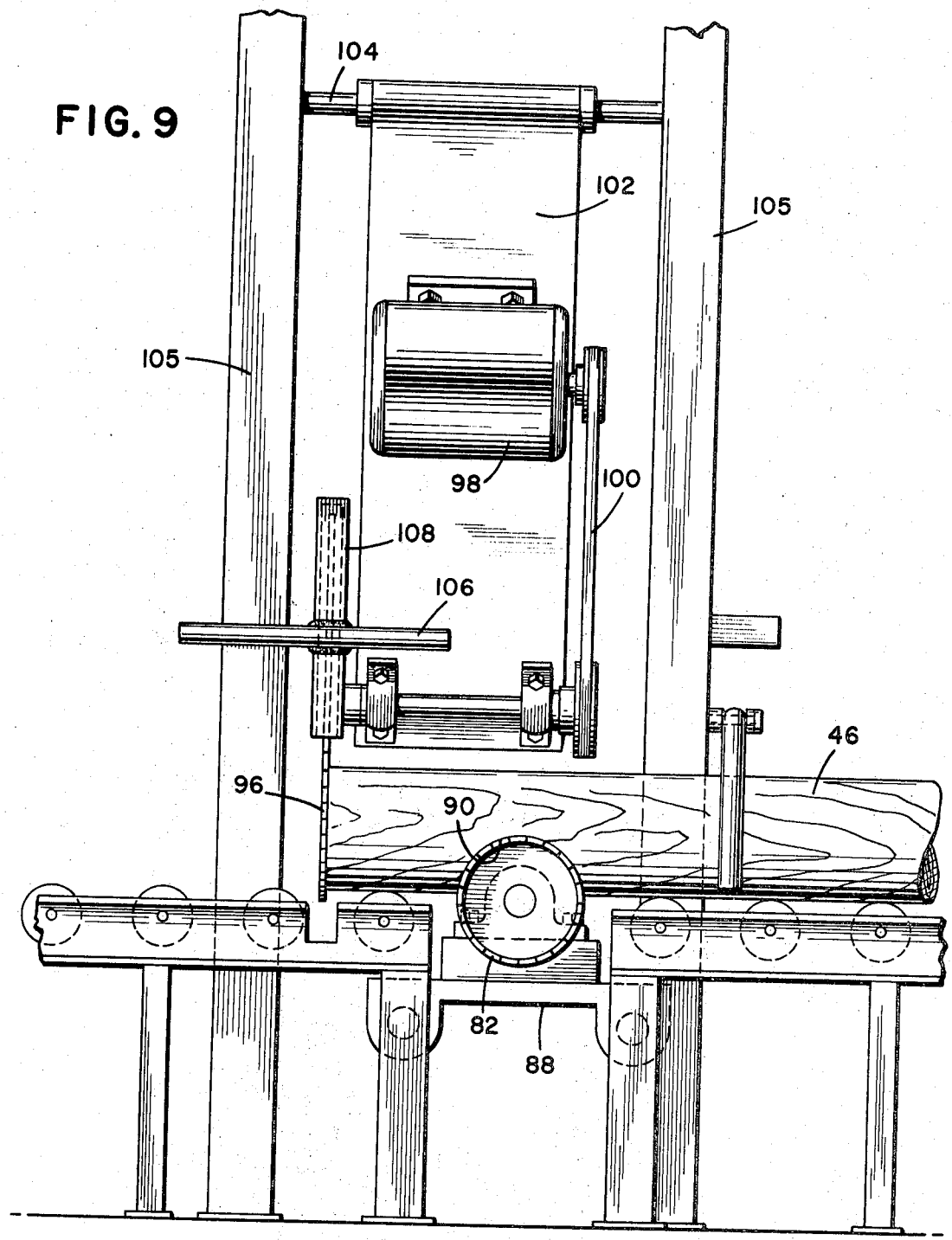
FIG. 9 is a front view of the transverse groover.

The final step of making a completely finished log is the cutting of a transverse groove at one or both end portions of log 46 to permit the stacking of logs in the interlocking corner relationship characteristic of log built structures, and exemplified in FIG. 7. The means for accomplishing this is shown in FIGS. 8 and 9 with reference to the following explanatory description.

After log 46 has been finished and grooved with longitudinal groove 60, it is moved into a cooperative relationship with a cylindrical member 80 having a toothed circumference 82 at one end and connected at the other end through shaft 84 to a motor 86. The unit consisting of groover 80, shaft 84 and motor 86 are mounted on a carriage 88 which is movable in the direction of arrow B and in the opposite direction thereof by any conventional means and preferably by a foot operated mechanism (not shown).

Member 80 has a circumference which is substantially equal to the circumference of the finished log 46; as carriage 88 is moved in the direction of arrow B, motor 86 is energized to cause member 80 to rotate. Toothed end 82 cuts a transverse groove 90 in log 46 such that the deepest part of the groove 90 in log 46 is substantially tangential to a diameter of the log; groove 90 extends into log 46 to a depth equal to a finished radius of the log.

Member 80 is spaced a predetermined distance from circular saw 96 driven by a motor 98 through a conventional belt drive arrangement generally designated 100. Circular saw 96 is supported by member 102 on which motor 98 is mounted, member 102 being pivotted about supporting bar 104 mounted on vertical support frame members 105 to permit circular saw 96 to be swung through an arc to cut the end of log 46 the aforementioned predetermined distance from transverse groove 90. Handle 106, rigidly connected to protective cover 108 covering circular saw 96 is grasped manually to pull the saw in the direction of arrow C to make a transverse cut through log 46. Upon release of handle 106, circular saw 96 returns to its initial, or rest, position through the action of counter weight 110 connected to cover 108 through a conventional pulley means generally designated 112.

It is contemplated that the last two steps of cutting the transverse groove and cutting the end of the log could be accomplished simultaneously by connecting carriage 88 with circular saw 96, and particularly cover 108 or support 102 thereof, for concurrent movement into and out of cutting relationship with log 46.

The embodiment described above is considered to be only the best mode presently contemplated by the inventors and it is understood that the scope of the present invention is limited only by the scope of the claims appended hereto; all reasonable variations of the above-described embodiment are contemplated within the scope of the present invention.

What is claimed is:

1. A method of finishing a log, comprising the steps of: rotatably mounting a log to be finished on a frame; rotating said log about its longitudinal axis; and simultaneously stripping and finishing said log, including: moving a carriage containing an arcuately shaped cutting member in a first direction longitudinally of said log; whereby the leading portion of said cutting member strips said log of its outer covering to a predetermined depth and the trailing portion of said cutting member finishes the resulting exposed surface of said log, said method further comprising the steps of: moving said carriage in a second direction opposite to the first direction; and cutting a longitudinal arcuately shaped groove of a predetermined depth in said log in it finished state, said groove having a radius approximately equal to the radius of said finished log.

2. A method according to claim 1, comprising the further step of stopping the rotation of said log prior to moving said carriage in said second direction.

3. A method according to claim 1, comprising the further step of cutting a transverse groove in said finished log, said transverse groove having an arcuate surface the radius of which is approximately equal to the radius of said finished log.

* * * * *